US012236896B2

(12) United States Patent
Sun et al.

(10) Patent No.: US 12,236,896 B2
(45) Date of Patent: Feb. 25, 2025

(54) DISPLAY PANEL AND ELECTRONIC APPARATUS

(71) Applicant: Wuhan China Star Optoelectronics Semiconductor Display Technology Co., Ltd., Hubei (CN)

(72) Inventors: Feixiang Sun, Hubei (CN); Hongyan Liu, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 18/515,319

(22) Filed: Nov. 21, 2023

(65) Prior Publication Data

US 2024/0355295 A1 Oct. 24, 2024

(30) Foreign Application Priority Data

Apr. 23, 2023 (CN) ......................... 202310443599.5

(51) Int. Cl.
*G09G 3/3266* (2016.01)
*G09G 3/3258* (2016.01)

(52) U.S. Cl.
CPC ......... *G09G 3/3266* (2013.01); *G09G 3/3258* (2013.01); *G09G 2310/061* (2013.01); *G09G 2310/08* (2013.01); *G09G 2320/0247* (2013.01); *G09G 2330/021* (2013.01)

(58) Field of Classification Search
CPC ............... G09G 3/3266; G09G 3/3258; G09G 2310/0286; G11C 19/28
See application file for complete search history.

(56) References Cited

U.S. PATENT DOCUMENTS

2021/0327368 A1* 10/2021 Park ..................... G09G 3/3275

* cited by examiner

*Primary Examiner* — Sardis F Azongha
(74) *Attorney, Agent, or Firm* — Nathan & Associates; Menachem Nathan

(57) ABSTRACT

The present invention provides a display panel and an electronic apparatus, including a first display part and a second display part, a plurality of second gate driving units electrically connected to the second display part and arranged in cascade, a plurality of first gate driving units electrically connected to the first display part and arranged in cascade. A first gate driving unit including a first output unit for transmitting a first voltage to an output terminal in response to a voltage of a first node, a second output unit for transmitting a second voltage to the output terminal in response to a voltage of a second node, an output terminal electrically connected to a corresponding first sub-pixel, a constant voltage control unit electrically connected to a first node or a second node.

15 Claims, 6 Drawing Sheets

DISPLAY PANEL AND ELECTRONIC APPARATUS

CROSS-REFERENCE TO RELATED APPLICATIONS

This application claims priority to Chinese Patent Application No. 202310443599.5 filed on Apr. 23, 2023. The disclosure of the aforementioned application is incorporated herein by reference in its entirety.

TECHNICAL FIELD

The present invention relates to display technology, and more particularly, to a display panel and an electronic apparatus.

BACKGROUND

With the development of OLED (Organic Light-Emitting Diode) folding products, a dual-screen design of a primary screen and a secondary screen have been gradually adopted, and the corresponding secondary screens can be used to view basic information after the folding products are folded.

Currently, in an existing dual-screen design, the primary screen and the secondary screen are generally separately designed, which doubles the module. Besides, the primary screen and the secondary screen are indiscriminately continuously driven, so that power consumption of the driving module is large. Both of the two above facts result in an increased cost of the OLED dual-screen display.

Therefore, the conventional OLED dual-screen display suffers from the above-mentioned high-cost problem and urgently needs to be improved.

SUMMARY

Embodiments of the present invention provide a display panel and an electronic apparatus.

One or more embodiments of the present invention provides a display panel comprising: a first display part; a second display part located on at least one side of the first display part; a plurality of pixel driving circuits electrically connected to the first display part and the second display part; a plurality of gate driving units, each comprising a first output unit, a second output unit, and an output terminal electrically connected to a corresponding one of the pixel driving circuits, the first output unit and the second output unit being configured to output a gate signal to a gate of at least one transistor of the corresponding one of the pixel driving circuits in response to a voltage of a first node and a voltage of a second node, respectively; wherein the plurality of gate driving units comprise a plurality of first gate driving units arranged in cascade and electrically connected to the first display part; wherein each of the first gate driving units includes a constant voltage control unit electrically connected to the first node or the second node, and the constant voltage control unit is configured to transmit a node control voltage to the first node or the second node in response to a switching control voltage, so that the first display part is always in a non-display state within at least one frame.

BRIEF DESCRIPTION OF THE DRAWINGS

The present invention is further illustrated by the accompanying drawings. It is to be noted that the drawings in the following description are merely illustrative of some embodiments of the present invention, and that other drawings may be made by those skilled in the art without involving any inventive effort.

EMBODIMENTS OF THE INVENTION

The technical solution in one or more embodiments of the present invention will be clearly and completely described with reference to the accompanying drawings. It will be apparent that the described embodiments are only part of the embodiments of the present invention and not all of them. Based on the embodiments of the present invention, all other embodiments obtained by a person skilled in the art without involving any inventive effort are within the scope of the present invention.

The terms "first", "second", etc. in the present invention are used to distinguish different objects and are not used to describe a particular order. Furthermore, the terms "including" and "having" and any variations thereof are intended to cover non-exclusive inclusion. For example, a process, method, system, product, or device that includes a series of steps or modules is not limited to the listed steps or modules, but optionally also includes steps or modules that are not listed, or optionally also includes other steps or modules inherent to such process, method, product, or device.

Reference herein to "an embodiment" means that a particular feature, structure, or characteristic described in connection with the embodiment may be included in at least one embodiment of the invention. The appearances of the phrases in various places in the specification are not necessarily all referring to the same embodiment, nor are they separate or alternative embodiments that are mutually exclusive of other embodiments. It will be explicitly and implicitly understood by those skilled in the art that the embodiments described herein may be combined with other embodiments.

Embodiments of the present invention provide pixel driving circuits including, but not limited to, the following embodiments and combinations between the following embodiments.

Figure 1:
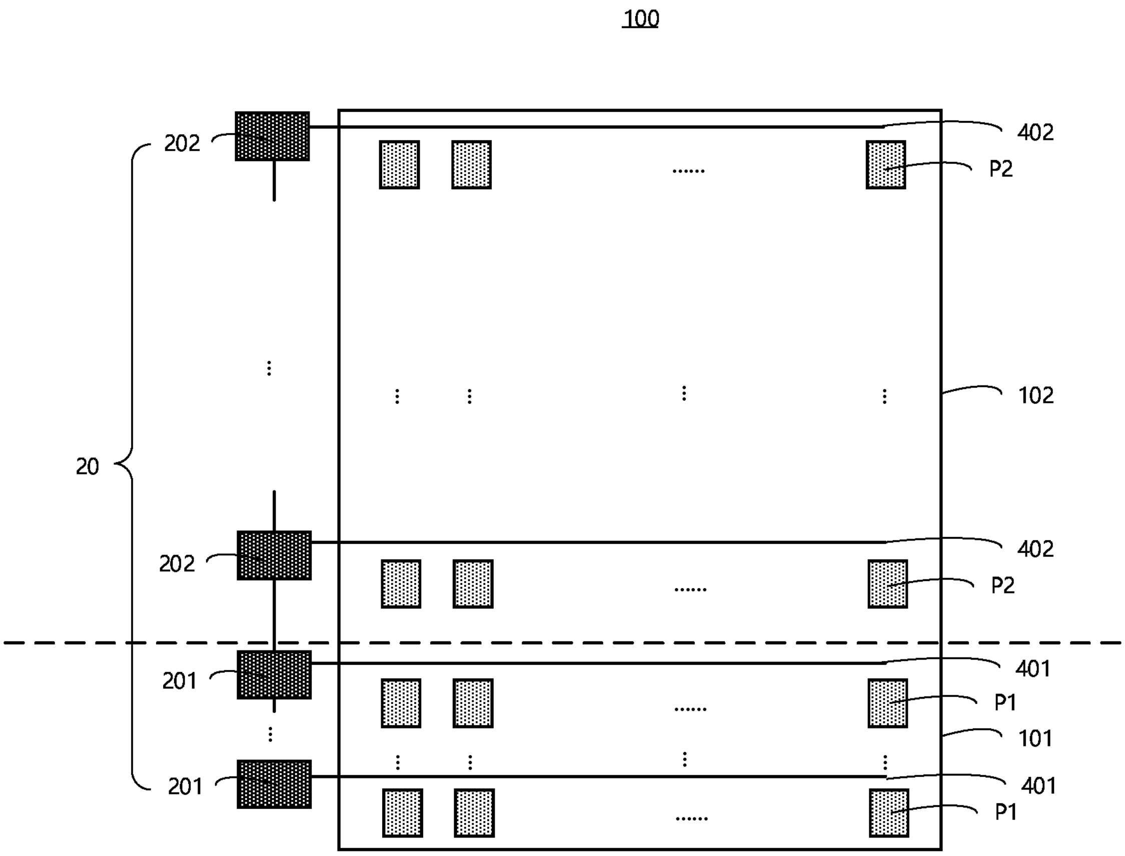
FIG. 1 is a top view of a display panel architecture according to one or more embodiments of the present invention.
Figure 2:
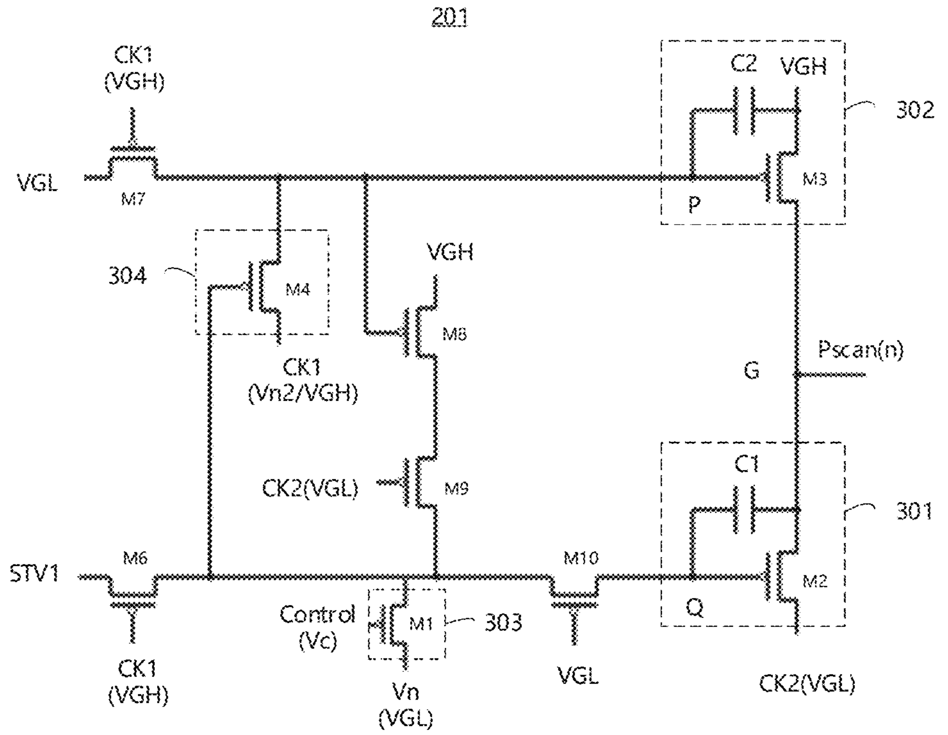
FIG. 2 is a circuit diagram of a first type of first gate driving unit according to one or more embodiments of the present invention.
Figure 3:
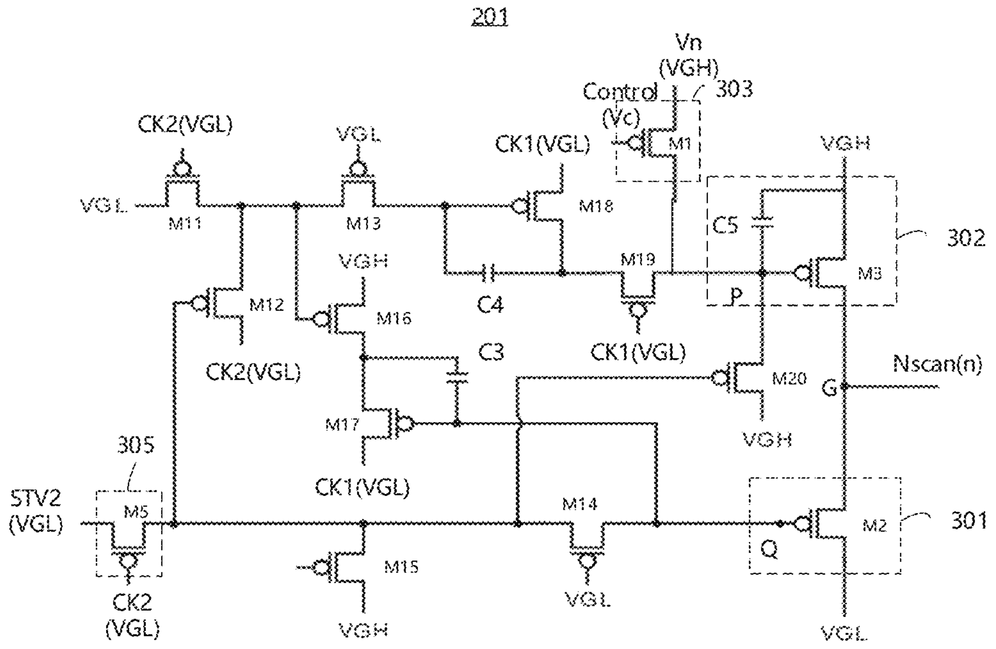
FIG. 3 is a circuit diagram of a second type of first gate driving unit according to one or more embodiments of the present invention.

In one embodiment, as shown in FIG. 1, a display panel 100 includes a first display part 101 including a plurality of first sub-pixels P1; a second display part 102 located on at least one side of the first display part 101; a plurality of pixel driving circuits (not shown) electrically connected to the first display part 101 and the second display part 102; a gate driving module 20 including a plurality of first gate driving units 201 electrically connected to the first display part 101 and arranged in cascade, and a plurality of second gate driving units 202 electrically connected to the second display part 102 and arranged in cascade. In the following, one of the plurality of first gate driving units 201 will be described since they all have similar structures, and one of the plurality of second gate driving units 202 will be described since they all have similar structures. As shown in FIGS. 2 and 3, the first gate driving unit 201 includes a first output unit 301, a second output unit 302 and an output terminal G electrically connected to a corresponding first sub-pixel P1, the first output unit 301 is configured to transmit a first voltage VGL to the output terminal G in response to a voltage of a first node Q, the second output unit 302 is configured to transmit a second voltage VGH to the output terminal G in response to a voltage of a second node P. The first gate driving unit 201 further includes a constant voltage control unit 303 electrically connected to the first node Q or the second node P, and as shown in FIGS. 1 to 3, the constant voltage control unit 303 is configured to transmit a node control voltage Vn to the first node Q (e.g., FIG. 2) or the second node P (e.g., FIG. 3) in response to a switching control voltage Vc so that the first display part 101 is always in a non-display state in a duration of at least one frame, even if the output terminal G constantly outputs the first voltage VGL or the second voltage VGH in the duration of at least one frame.

The display panel 100 may be, but is not limited to, a liquid crystal display panel or a self-luminous display panel. The self-luminous display panel may include, but is not limited to, an OLED display panel or an inorganic light-emitting diode display panel. Specifically, as shown in FIG. 1, the display panel 100 may include a first display part 101 and a second display part 102 that are driven by a plurality of first gate driving units 201 and a plurality of second gate driving units 202, respectively, where the relative positions of the first display part 101 and the second display part 102 are not limited, provided that the first display part 101, compared with the second display part 102, has a non-display state in the display process of the display panel 100, and the plurality of first gate driving units 201 are cascaded after the plurality of second gate driving units 202.

Based on the above arrangement, as shown in FIGS. 2 and 3, the first gate driving unit 201 in this embodiment is provided with a constant voltage control unit 303 electrically connected to the first node Q or the second node P, specifically, the constant voltage control unit 303 may transmit the node control voltage Vn to the first node Q (e.g., FIG. 2) or the second node P (e.g., FIG. 3) in response to the switching control voltage Vc. As can be seen in combination with "the first output unit 301 is configured to transmit the first voltage VGL to the output terminal G in response to the voltage of the first node Q, and the second output unit 302 is configured to transmit the second voltage VGH to the output terminal G in response to the voltage of the second node P", in this embodiment, by setting the constant voltage control unit 303, the switching control voltage Vc, and the node control voltage Vn to control the potential of the first node Q (e.g., FIG. 2) or the second node P (e.g., FIG. 3) so as to control whether the first output unit 301 transmits the first voltage VGL to the output terminal G or the second output unit 302 transmits the second voltage VGH to the output terminal G. For example, the output terminal G outputs the first voltage VGL. In practice, the output terminal G may also output the second voltage VGH. Since the first voltage VGL is not compared with the second voltage VGH, and the first output unit 301 and the second output unit 302 are not compared, it can be considered substantially the same that the output terminal G outputs the first voltage VGL or the second voltage VGH in a duration of at least one frame, provided that finally the first display part 101 is always in a non-display state in the duration of at least one frame.

It will be appreciated that in the present embodiment, when the first display part 101 is in the non-display state, by setting the constant voltage control unit 303, the switching control voltage Vc, and the node control voltage Vn in conjunction with the above discussion, the output terminal G of the first gate driving unit 201 is controlled to output a constant value, i.e. the first voltage VGL, such that the waveform of the output signal corresponding to the output terminal G of the first display part 101 in the non-display state is approximately a straight line, instead of a pulse signal having a pulse in the duration of the frame, thereby effectively reducing the power consumption of the first gate driving unit 201, thereby reducing the power consumption of the gate driving module 20.

Note that in the present invention, for the plurality of first gate driving units 201 electrically connected to the first display part 101 and arranged in cascade, and the plurality of second gate driving units 202 electrically connected to the second display part 102 and arranged in cascade, the circuit of each of the plurality of first gate driving units 201 cascaded after the plurality of second gate driving units 202 is improved as described above, so that the corresponding output terminal G outputs the first voltage VGL, which, while reducing the power consumption of the gate driving module 20, may allow the first display part 101 to be in a non-display state (that is, a black screen) without affecting the normal display of the second display part 102. For ease of description herein, only the case where the plurality of first gate driving cells 201 are located after a plurality of second gate driving cells 202 will be described as an example.

In one embodiment, as shown in FIGS. 2 and 3, the constant voltage control unit 303 includes a constant voltage control transistor M1, one of a source and drain of which is loaded with the node control voltage Vn, and the other of which is electrically connected to the corresponding first node Q (e.g., FIG. 2) or the second node P (e.g., FIG. 3). As shown in FIGS. 1 to 3, the gate of the constant voltage control transistor M1 is configured to be loaded with the switching control voltage Vc to turn on the constant voltage control transistor M1 to control the node control voltage Vn to be transmitted to the first node Q (for example, FIG. 2) or the second node P (for example, FIG. 3) so that the first display part 101 is in the non-display state even if the output terminal G outputs the first voltage VGL.

As shown in FIGS. 2 and 3, the gate of the constant voltage control transistor M1 may be loaded with the switch control signal Control. Specifically, in conjunction with the above discussion, it can be understood as that the switch control signal Control is constantly equal to the switch control voltage Vc when the first display part 101 is in the non-display state, and the switch control voltage Vc may control the constant voltage control transistor M1 to be turned on, thereby controlling the node control voltage Vn loaded into the source or the drain of the constant voltage control transistor M1 to be transmitted to the first node Q (e.g., FIG. 2) or the second node P (e.g., FIG. 3). As discussed above, the node control voltage Vn transmitted to the first node Q (e.g., FIG. 2) or the second node P (e.g., FIG. 3) may allow the output from the output terminal G of the first gate driving unit 201 to be a constant value, i.e. the first voltage VGL, such that the waveform of a corresponding signal output by the output terminal G within a duration of at least one frame when the first display part 101 is in the non-display state is almost a straight line, instead of a pulse signal having a pulse. The power consumption of the first gate driving unit 201 is effectively reduced, thereby reducing the power consumption of the gate driving module 20.

For ease of description, the invention only takes the first voltage VGL less than the second voltage VGH as an example.

In one embodiment, as shown in FIG. 2, the constant voltage control unit 303 is electrically connected to the first node Q. The first output unit 301 includes a first output transistor M2, a gate of which is electrically connected to the first node Q, one of a source and a drain of which is electrically connected to the output terminal G of the first gate driving unit 201, and the other of which is loaded with the first voltage VGL. As shown in conjunction with FIGS. 1 and 2, the switching control voltage Vc is configured to control the node control voltage Vn to be transmitted to the first node Q in a duration of at least one frame to turn on the first output transistor M2 so that the first voltage VGL is transmitted to the output terminal G through the first output transistor M2.

Specifically, when the first display part 101 is in the non-display state, in conjunction with the above discussion, the switching control voltage Vc controls the node control voltage Vn to be transmitted to the first node Q. Further, the first output unit 301 in the present embodiment includes the first output transistor M2, and the gate of the first output transistor M2 is electrically connected to the first node Q, so that the first output transistor M2 is turned on, and at this time the source or the drain of the first output transistor M2 is loaded with the first voltage VGL, so that the first voltage VGL can be transmitted to the output terminal G through the first output transistor M2.

Note that the magnitude relationship between the node control voltage Vn and the switching control voltage Vc and their respective ranges are not limited in this embodiment. As discussed above, it is only required that the switching control voltage Vc can turn on the constant voltage control transistor M1 and the node control voltage Vn can turn on the first output transistor M2. For example, as shown in FIG. 2, when the constant voltage control transistor M1 and the first output transistor M2 are both P-type transistors, the node control voltage Vn and the switching control voltage Vc may each be lower voltages, for example, the node control voltage Vn may be equal to the first voltage VGL.

In one embodiment, as shown in FIG. 2, the second output unit 302 includes a second output transistor M3, the gate of which is electrically connected to the second node P, one of the source and the drain of which is electrically connected to the output terminal G of the first gate driving unit 201, and the other of which is loaded with the second voltage VGH. The first gate driving unit 201 further includes a first output control unit 304 electrically connected between the constant voltage control transistor M1 and the second node P. As shown in conjunction with FIGS. 1 and 2, the switch control voltage Vc is configured to control the node control voltage Vn to be transmitted to the first output control unit 304 within a duration of at least one frame (i.e., the duration of the frame(s) in which the switch control voltage Vc controls the node control voltage Vn to be transmitted to the first node Q to turn on the first output transistor M2) so that the first output control unit 304 turns off the second output transistor M3 through the second node P.

It will be appreciated that in the present embodiment, the first output control unit 304 is further provided between the constant voltage control transistor M1 and the second node P. When the first display part 101 is in the non-display state, since the switching control voltage Vc can control the node control voltage Vn to be transmitted to the first output control unit 304, the potential of the second node P can be further controlled by the first output control unit 304, thereby controlling the second output transistor M3 to be turned off. As discussed above, even if the source or the drain of the second output transistor M3 is loaded with the second voltage VGH, the second voltage VGH cannot be transmitted to the output terminal G through the second output transistor M3 at this time, so that interference with the transmission of the first voltage VGL to the output terminal G through the first output transistor M2 is avoided, so that the potential of the output terminal G is close to the first voltage VGL.

Specifically, as shown in FIG. 2, for example, the first output control unit 304 may include a first output control transistor M4 whose gate is electrically connected to the source or the drain of the constant voltage control transistor M1. It can be seen from the above discussion that when the first display part 101 is in the non-display state, the node control voltage Vn may be transmitted to the gate of the first output control transistor M4 to turn on the gate of the first output control transistor M4. Further, one of the source and the drain of the first output control transistor M4 may be loaded with the second node control voltage Vn2, and the other may be electrically connected to the gate of the second output transistor M3 to transmit the second node control voltage Vn2 to the gate of the second output transistor M3 to turn on the second output transistor M3 through the turned-on first output control transistor M4.

Similarly, it is further required in this embodiment that the node control voltage Vn can turn on the first output control transistor M4, and that the second node control voltage Vn2 can turn off the second output transistor M3. For example, when the first output control transistor M4 and the second output transistor M3 are both P-type transistors, the node control voltage Vn and the second node control voltage Vn2 may be a lower voltage and a higher voltage, respectively. For example, the node control voltage Vn may be equal to the first voltage VGL, and the second node control voltage Vn2 may be equal to the second voltage VGH.

In one embodiment, as shown in FIG. 3, the constant voltage control unit 303 is electrically connected to the second node P. The second output unit 302 includes a second output transistor M3, a gate of which is electrically connected to the second node P, one of a source and a drain of which is electrically connected to the output terminal G of the first gate driving unit 201, and the other of which is loaded with the second voltage VGH. As shown in conjunction with FIGS. 1 and 3, the switching control voltage Vc is configured to control the node control voltage Vn to be transmitted to the second node P to turn off the second output transistor M3 in a duration of at least one frame.

It will be appreciated that in the present embodiment, when the first display part 101 is in the non-display state, in conjunction with the above discussion, the switching control voltage Vc may control the node control voltage Vn to be transmitted to the gate of the second output transistor M3 to turn off the second output transistor M3, and even if the source or the drain of the second output transistor M3 is loaded with the second voltage VGH, the second voltage VGH cannot be transmitted to the output terminal G through the second output transistor M3 at this time, thereby preventing the output terminal G of the second output transistor M3 from outputting the second voltage VGH that does not meet the requirements.

Similarly, as shown in FIG. 3, based on the fact that both the constant voltage control transistor M1 and the second output transistor M3 are P-type transistors, the switching control voltage Vc in this embodiment may be a lower voltage to control the constant voltage control transistor M1 to be turned on, and the node control voltage Vn may be a higher voltage (for example, equal to the second voltage VGH) to control the second output transistor M3 to be turned off.

In one embodiment, as shown in FIG. 3, the first output unit 301 includes the first output transistor M2, the gate of which is electrically connected to the first node Q, one of the source and the drain of which is electrically connected to the output terminal G of the first gate driving unit 201, and the other of which is loaded with the first voltage VGL. The first gate driving unit 201 further includes a second output control unit 305 electrically connected to the first node Q. As shown in conjunction with FIGS. 1 and 3, the second output control unit 305 is configured to turn on the first output transistor M2 through the first node Q in a duration of at least one frame (i.e., the duration of the frame(s) in which the switching control voltage Vc controls the node control voltage Vn to be transmitted to the second node P to turn off the second output transistor M3) so that the first voltage VGL is transmitted to the output terminal G through the first output transistor M2.

As shown in FIG. 3, the second output control unit 305 may include a second output control transistor M5, which may be turned on to turn on the first output transistor M2 through the first node Q when the first display part 101 is in the non-display state. Specifically, the case where the second output control transistor M5 and the first output transistor M2 are both P-type transistors is taken as an example, and in conjunction with the above discussion, when the first display part 101 is in the non-display state, the gate of the second output control transistor M5 may be loaded with a lower voltage (for example, equal to the first voltage VGL) to turn on the second output control transistor M5, and the source or the drain of the second output control transistor M5 may be loaded with a lower voltage (for example, equal to the first voltage VGL) to turn on the first output transistor M2 so that the first voltage VGL is transmitted to the output terminal G through the first output transistor M2.

In particular, in the plurality of first gate driving units 201 arranged in cascade, the $1^{st}$-stage first gate driving unit 201 (i.e., the one located at a first stage) may be as discussed above. In the $1^{st}$-stage first gate driving unit 201, when the first display part 101 is in the non-display state, the gate of the second output control transistor M5 may be turned off and the connection with the output terminal of the last-stage second gate driving unit 202 (i.e., the one of the previous stage) is off, and a lower voltage (for example, equal to the first voltage VGL) is applied to prevent the pulse signal output from the output terminal of the second gate driving unit 202 at the previous stage from causing the second output control transistor M5 unable to be turned on. Regarding the $2^{nd}$-stage first gate driving unit 201, since the output terminal of the $1^{st}$-stage first gate driving unit 201 outputs the first voltage VGL (lower voltage), the second output control transistor M5 of the $2^{nd}$-stage first gate driving unit 201 can also be realized in the turned-on state to realize that the output terminal G outputs the first voltage VGL (lower voltage), and so on, each of the output terminals G of the plurality of first gate driving units 201 can output the first voltage VGL (lower voltage).

However, as discussed above, for each of the first gate driving units 201, it is still necessary to provide the constant voltage control unit 303 to control the second output transistor M3 to be turned off, thereby avoiding transmission of the second voltage VGH to the first voltage VGL to avoid interference.

Figure 4:
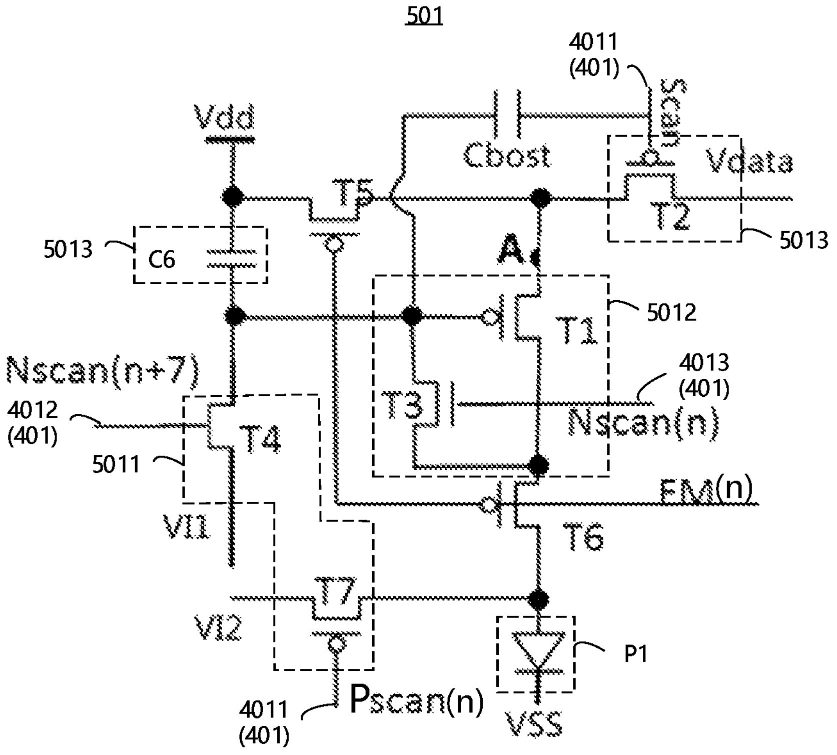
FIG. 4 is a circuit diagram of a first pixel driving circuit according to one or more embodiments of the present invention.

In one embodiment, as shown in conjunction with FIGS. 1 to 5, as discussed above, the first display part 101 includes a plurality of first sub-pixels P1, the plurality of pixel driving circuits include a plurality of first pixel driving circuits 501 electrically connected to the plurality of first sub-pixels P1 respectively. The display panel 100 further includes a plurality of first gate lines 401 respectively electrically connected to the plurality of output terminals G of the plurality of first gate driving units 201, and each of the first pixel driving circuits is electrically connected between a corresponding first sub-pixel P1 and a corresponding first gate line 401. As shown in FIG. 4, each of the first gate lines 401 is electrically connected to a gate of at least one transistor (e.g., at least one of T1 to T7) of the corresponding first pixel driving circuit 501 to transmit the first voltage VGL or the second voltage VGH in a duration of at least one frame to control the at least one transistor so that the first sub-pixel P1 in the first display part 101 is in a non-light emitting state in the duration of at least one frame.

Similarly, as shown in FIG. 1, the display panel 100 further includes a plurality of second gate lines 402 electrically connected to a plurality of output terminals of the plurality of first gate driving units 201, respectively; a plurality of second pixel driving circuits (not shown), each of which is electrically connected between a corresponding second sub-pixel P2 (included in the second display part 102) and a corresponding second gate line 402.

It will be appreciated in conjunction with the above discussion that, in the present embodiment, the constant voltage signal (for example, the first voltage VGL or the second voltage VGH) output from the output terminal G of each of the first gate driving unit 201 is applied to the gate of at least one of T1 to T7 Thereby, in combination with the switching characteristics of the transistors, it is possible to realize that the first sub-pixels P1 are in the non-light-emitting state when the first display part 101 is in the non-display state. That is, it is possible to realize that the first sub-pixels P1 are in the non-light-emitting state while reducing the power consumption of the first gate driving units 201, so that the first display part 101 is in the non-display state.

Specifically, as shown in FIG. 4, for the first gate lines 401 corresponding to the first gate driving unit 201 of each stage, the one corresponding to the $n^{th}$-stage (n is a positive integer) is taken as an example. The first gate lines 401 may include a plurality of sub-gate lines for transmitting the signal Pscan (n), the signal Nscan (n), the signal Nscan (n+7), and the signal EM (n), respectively, where the signal Pscan (n), the signal Nscan (n), and the signal EM (n) may be output by the output terminals G of the Pscan-type first gate driving unit 201 (with circuit structure such as FIG. 2), the Nscan-type first gate driving unit 201 (with circuit structure such as FIG. 3), and the EM-type first gate driving unit 201 of this stage, respectively, and the signal Nscan (n), the signal Nscan (n+7) may be output by the output terminals G of the $n^{th}$-stage and the $(n+7)^{th}$-stage-Nscan type first gate driving units 201, respectively.

Figure 5:
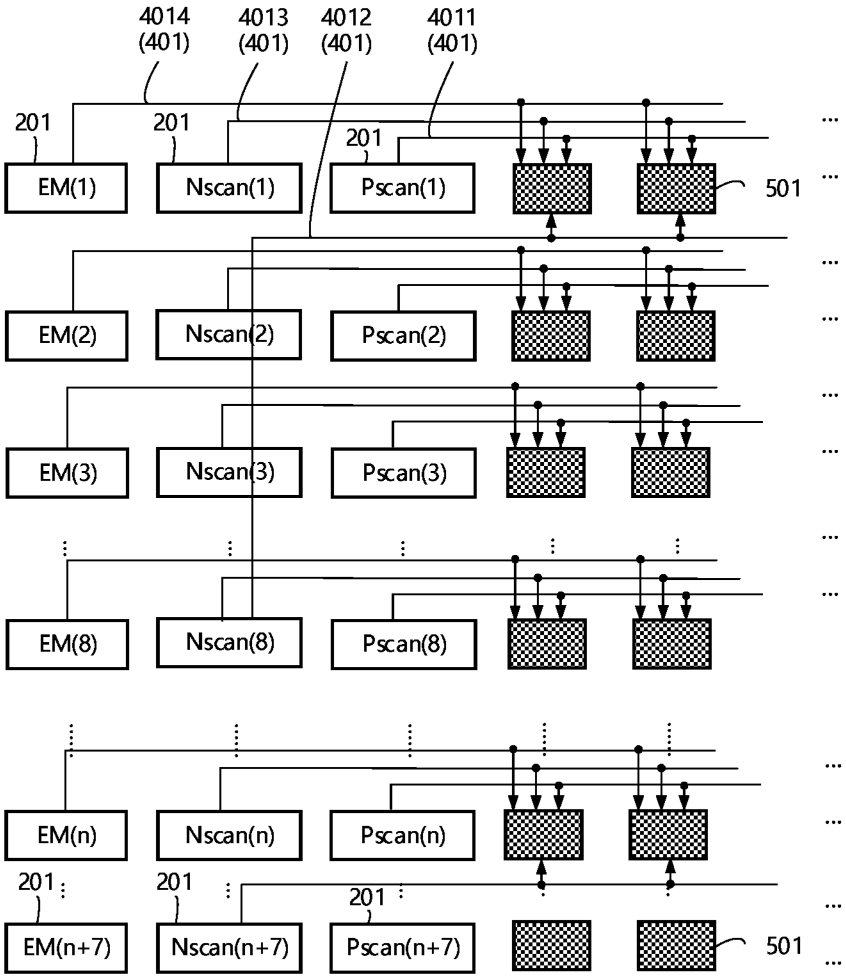
FIG. 5 is a schematic diagram showing a connection relationship between a gate driving module and a plurality of pixel driving circuits according to one or more embodiments of the present invention.

As shown in FIG. 5, FIG. 5 is a schematic diagram showing connection relationship between the plurality of first pixel driving circuits 501 and the corresponding plurality of first gate driving units 201. Specifically, the following settings can be made, but are not limited to, in combination with those shown in FIGS. 1 to 5 and related discussions above.

Each EM-type first gate driving unit 201 may be electrically connected to a plurality of first pixel driving circuits 501 of the same stage (e.g., the same row) through a corresponding fourth sub-gate line 4014 (included in the first gate line 401) to load an EM signal of the present stage to the gate of the third switching transistor T6 therein. For example, the gate of the third switching transistor T6 in each first pixel driving circuit 501 of the $n^{th}$ (n is a positive integer) row may be loaded with an EM (n) signal generated by the $n^{th}$-stage EM-type first gate driving unit 201.

Each Nscan-type first gate driving unit 201 may be electrically connected to a plurality of first pixel driving circuits 501 of the same stage (e.g., the same row) through a corresponding third sub-gate line 4013 (included in the first gate line 401) to load the signal Nscan of the present stage to the gate of the first switching transistor T3 therein, and may also be electrically connected to a plurality of first pixel driving circuits 501 of a certain stage (e.g., the same row) in the preceding stages through a corresponding second sub-gate line 4012 (included in the first gate line 401) to load the signal Nscan of the present stage to the gate of the second reset transistor T4 therein. For example, the gates of the first switching transistor T3 and of the second reset transistor T4 in each first pixel driving circuit 501 of the $n^{th}$ row may be respectively loaded with the signal Nscan (n) generated by the $n^{th}$-stage Nscan-type first gate driving unit 201 and the signal Nscan (n+7) generated by the $(n+7)^{th}$-stage Nscan-type first gate driving unit 201;

Each Pscan-type first gate driving unit 201 may be electrically connected to a plurality of first pixel driving circuits 501 of the same stage (e.g., the same row) through a corresponding first sub-gate line 4011 (included in the first gate line 401) so as to load the Pscan signal of the present stage to the gate of the first reset transistor T7 and the gate of the write transistor T2 therein. For example, the gate of the first reset transistor T7 and the gate of the write transistor T2 of each first pixel driving circuit 501 of the $n^{th}$ row may be loaded with the signal Pscan (n) generated by the $n^{th}$-stage Pscan-type first gate driving unit 201.

In one embodiment, in conjunction with FIGS. 4 and 5 and the above discussion, the $n^{th}$-stage first pixel driving circuit 501 includes a reset module 5011 including a first reset transistor T7, the gate of which is electrically connected to a corresponding first gate line 401 to be loaded with the gate signal (e.g., a signal Pscan (n)), one of the source and the drain of which is loaded with a third voltage VI2, and the other of which is electrically connected to the first sub-pixel P1. The gate signal (e.g., the signal Pscan (n)) is equal to the first voltage VGL or the second voltage VGH in a duration of at least one frame to control the first reset transistor T7 to be turned on so that the third voltage VI2 is transmitted to the corresponding first sub-pixel P1 so that the first sub-pixel P1 is in a non-light-emitting state.

Specifically, in this example, the first reset transistor T7 is a P-type transistor. It can be seen from the above discussion that when the first display part 101 is in the non-display state, since the signal Pscan (n) (equal to the first voltage VGL) transmitted by the first gate line 401 (for example, the first sub-gate line 4011) is a lower voltage, which means that the first reset transistor T7 can be controlled to be turned on, and at the same time, the third voltage VI2 can be a lower voltage, and is applied to the first sub-pixel P1 through the first reset transistor T7 (for example, the first sub-pixel P1 is an anode of an organic light-emitting diode), which would not cause the terminal voltage of the first sub-pixel P1 to reach the turn-on voltage, so that the first sub-pixel P1 is in a non-light-emitting state.

As can be seen from the above discussion, the output terminal G in the circuit diagram shown in FIG. 2 (as the Pscan-type first gate driving unit 201) may be, but is not limited to, electrically connected to the gate of the first reset transistor T7 and the gate of the write transistor T2 in the first pixel driving circuit 501 (see FIG. 4) of the corresponding stage (taking the $n^{th}$ stage as an example). The Pscan-type first gate driving unit 201 in FIG. 2 may include a first clock signal line for transmitting the first clock signal CK1, a second clock signal line for transmitting the second clock signal CK2, and may further include a first input transistor M6, a second input transistor M7, a first control transistor M8, a second control transistor M9, and a third control transistor M10. The third control transistor M10 is connected between the first input transistor M6 and the first node Q, and one of the source and the drain of the first input transistor M6 may be electrically connected to the output terminal G of the last-stage first gate driving unit 201 to be loaded with the first initial signal STV1. The first initial signal STV1 of the $1^{st}$-stage first gate driving unit 201 may be directly provided by an external signal, or may be electrically connected to the output terminal G of the last-stage second gate driving unit 202 (since the first input transistor M6 may be always turned off, see analysis below).

It will be appreciated that, as discussed above, considering that the first reset transistor T7 in FIG. 4 (which is a P-type transistor in the example) needs to be turned on, the signal Pscan (n) output from the output terminal G in FIG. 2 may be equal to the lower first voltage VGL. Based on this, it may be provided that, in a duration of at least one frame, in the Pscan-type first gate driving unit 201 of each stage, the first clock signal CK1 and the second clock signal CK2 are loaded in a same manner, and the first clock signal CK1 and the second clock signal CK2 are equal to the constant higher voltage (e.g., equal to the second voltage VGH) and the lower voltage (e.g., equal to the first voltage VGL), respectively, as follows.

The gate of the first input transistor M6 may be connected to the first clock signal line to load the first clock signal CK1 (at this time equal to VGH) to control the first input transistor M6 to be turned off. The gate of the third control transistor M10 may be loaded with the first voltage VGL so that the third control transistor M10 is always turned on, so that the node control voltage Vn (which may be equal to VGL) is transmitted to the first node Q through the constant voltage control transistor M1 and the third control transistor M10, so that the first output transistor M2 is turned on. The first voltage VGL loaded into the source or the drain of the second output transistor M2 can be essentially the second clock signal CK2. The first voltage VGL may be transmitted to the output terminal G through the second output transistor M2. The potential of the first node Q is simultaneously pulled down due to the coupling effect of the first capacitor C1, so that the conductivity of the second output transistor M2 is also greatly increased. The output current causes the output terminal G to output the first voltage VGL. The source or the drain of the second input transistor M7 may be loaded with a first voltage VGL, and the gate of the second input transistor M7 is loaded with a first clock signal CK1 (at this time equal to VGH) to turn off the second input transistor M7. The first control transistor M8 and the second control transistor M9 are connected in series. The gate of the first control transistor M8 is electrically connected to the second node P. The source or the drain of the second control transistor M9 is electrically connected to the constant voltage control unit 303. The source or the drain of the first control transistor M8 is loaded with the second voltage VGH, and the gate of the second control transistor M9 is loaded with the second clock signal CK2 (equal to VGL at this time) to turn off the second control transistor M9. The node control voltage Vn (which may be equal to VGL) causes the first output control transistor M4 to be turned on by the constant voltage control transistor M1, and a first clock signal CK1 (which is equal to VGH or the second node control voltage Vn2 at this time) loaded by the source or the drain of the first output control transistor M4 turns off the second output transistor M3 through the first output control transistor M4. The second output transistor M3 also has a second capacitance C2 between the gate and the source (or the drain) of the second output transistor M3;

Meanwhile, in the present embodiment, when the first display part 101 is in the non-display state, the second clock signal CK2 and the first clock signal CK1 corresponding to the multi-stage Pscan-type first gate driving units 201s are set to be different constant voltage signals, respectively. When the output terminals G of the first gate driving units 201 are realized to output the first voltage VGL, the power consumption of the circuit for generating the first clock signal CK1 and the second clock signal CK2 can be further reduced, thereby further reducing the power consumption of the display panel 100.

Note that, as shown in FIGS. 1 and 2, as compared with FIG. 2, the circuit diagram of the Pscan-type second gate driving units 202 corresponding to the second display part 102 may omit or keep the constant voltage control unit 303 (for example, by controlling the constant voltage control transistor M1 to be turned off by the switch control signal Control), and the first clock signal CK1 is loaded in a reverse manner from the second clock signal CK2 in the Pscan-type second gate driving units 202 of two adjacent stages to realize normal light-emitting of the second display part 102.

In one embodiment, as shown in conjunction with FIGS. 4 and 5, the first gate line 401 includes the first sub-gate line 4011, the second sub-gate line 4012, and the third sub-gate line 4013. The gate signal includes a first gate signal (e.g., the signal Pscan (n)), a second gate signal (e.g., the signal Nscan (n+7)), and the third gate signal (e.g., the signal Nscan (n)). The first pixel driving circuit 501 includes: a driving module 5012 including a driving transistor T1 and a first switching transistor T3 connected between a gate and a drain of the driving transistor T1, the drain of the driving transistor T1 being connected to the first sub-pixel P1, and a gate of the first switching transistor T3 being electrically connected to the third sub-gate line 4013 to be loaded with the third gate signal; a write module 5013 including a write transistor T2, a gate of which being electrically connected to a corresponding first sub-gate line 4011 to be loaded with the first gate signal, one of a source and a drain of which being loaded with a data voltage signal Vdata, and the other of which being electrically connected to the source of the drive transistor T1; a reset module 5011 including a second reset transistor T4, the gate of which being electrically connected to the second sub-gate line 4012 to be loaded with the second gate signal, one of the source and the drain of which being loaded with a fourth voltage VI1, and the other of which being electrically connected to the gate of the driving transistor T1; a maintaining module 5014 electrically connected to the gate of the driving transistor T1. In a duration of the $m^{th}$ (m is a positive integer) frame, the second gate signal (e.g., the signal Nscan (n+7)) is configured to control the second reset transistor T4 to be turned on so that the fourth voltage VI1 is transmitted to the gate of the driving transistor T1 to turn off the driving transistor T1. In a duration of the $(m+1)^{th}$ frame, the third gate signal (e.g., the signal Nscan (n)) is always equal to the first voltage VGL or the second voltage VGH to control the first switching transistor T3 to be turned off, and the maintaining module 5014 is configured to maintain the driving transistor T1 to be turned off.

Therefore, it can be considered that the second gate signal (for example, the signal Nscan (n+7) described above) and the third gate signal (for example, the signal Nscan (n) described above) are electrically connected to two first gate driving units 201 of different stages (for example, the Nscan-type first gate driving units 201), respectively, and the circuit structures of the two first gate driving units 201 are the same.

Specifically, in the case where the driving transistor T1 and the writing transistor T2 are P-type transistors, and the first switching transistor T3 and the second reset transistor T4 are N-type transistors, it can be seen from the above discussion that in a duration of the $m^{th}$ frame, the signal Nscan (n+7) controls the second reset transistor T4 to be turned on, and the higher fourth voltage VI1 is transmitted to the gate of the driving transistor T1 to turn off the driving transistor T1, and the maintaining module 5014 can maintain the driving transistor T1 to be turned off in a duration of the $(m+1)^{th}$ frame, so that when the first display part 101 is in the non-display state (for example, in the duration of the $(m+1)^{th}$ frame), the signal Pscan (n), the signal Nscan (n+7), and the signal Nscan (n) transmitted by the first gate line 401 (which is, for example, the first sub-gate line 4011, the second sub-gate line 4012, and the second sub-gate line 4013), respectively, are lower first voltages VGL. Although the writing transistor T2 is turned on, since the first switching transistor T3 is turned off, it is considered that the voltage loaded into the source of the driving transistor T1 (connected to the node A) cannot be transmitted to the gate of the driving transistor T1 through the first switching transistor T3, while the maintaining module 5014 can maintain the high potential of the gate of the driving transistor T1 when reset, thereby maintaining the driving transistor T1 to be stably turned off, avoiding current from flowing through the first sub-pixel P1, and enabling the first sub-pixel P1 to be in a non-light-emitting state. The maintaining module 5014 may include a maintaining capacitor C6, and two plates of the maintaining capacitor C6 are respectively connected to the gate of the driving transistor T1 and a wire loaded with a fifth voltage VDD.

As can be seen from the above discussion, the output terminal G in the circuit diagram (as the Nscan-type first gate driving unit 201) shown in FIG. 3 can be, but is not limited to, electrically connected to the gate of the first switching transistor T3 in the first pixel driving circuit 501 (see FIG. 4) of the corresponding stage (taking the $n^{th}$ stage as an example). And the gate of the second reset transistor T4 in the first pixel driving circuit 501 of the corresponding stage (taking the $n^{th}$ stage as an example) is electrically connected to the output terminal G of the $(n+7)^{th}$ stage Nscan-type first gate driving unit 201. The Nscan-type first gate driving unit 201 in FIG. 3 may include a first clock signal line for transmitting the first clock signal CK1, a second clock signal line for transmitting the second clock signal CK2, and may further include a third input transistor M11, a fourth control transistor M12 to a third control transistor M20. Refer to FIG. 3 for the specific connection, loaded signals, and related electrical devices. In particular, the source or the drain of the seventh control transistor M15 may be electrically connected between the second output control transistor M5 and the sixth control transistor M14 connected in series, and the seventh control transistor M15 may be turned on when the display panel 100 is powered on, so that the first gate driving unit 201 can be stabilized, thereby preventing the screen from blinking due to the output abnormality of the first gate driving unit 201, and the seventh control transistor M15 is turned off when the screen is normally displayed. One of the source and the drain of the second output control transistor M5 may be electrically connected to the output terminal G of the last-stage first gate driving unit 201 to load the second initial signal STV2, where the second initial signal STV2 of the 1st-stage first gate drive unit 201 can be supplied directly by an external signal to be electrically disconnected from the last-stage second gate driving unit 202.

Figure 6:
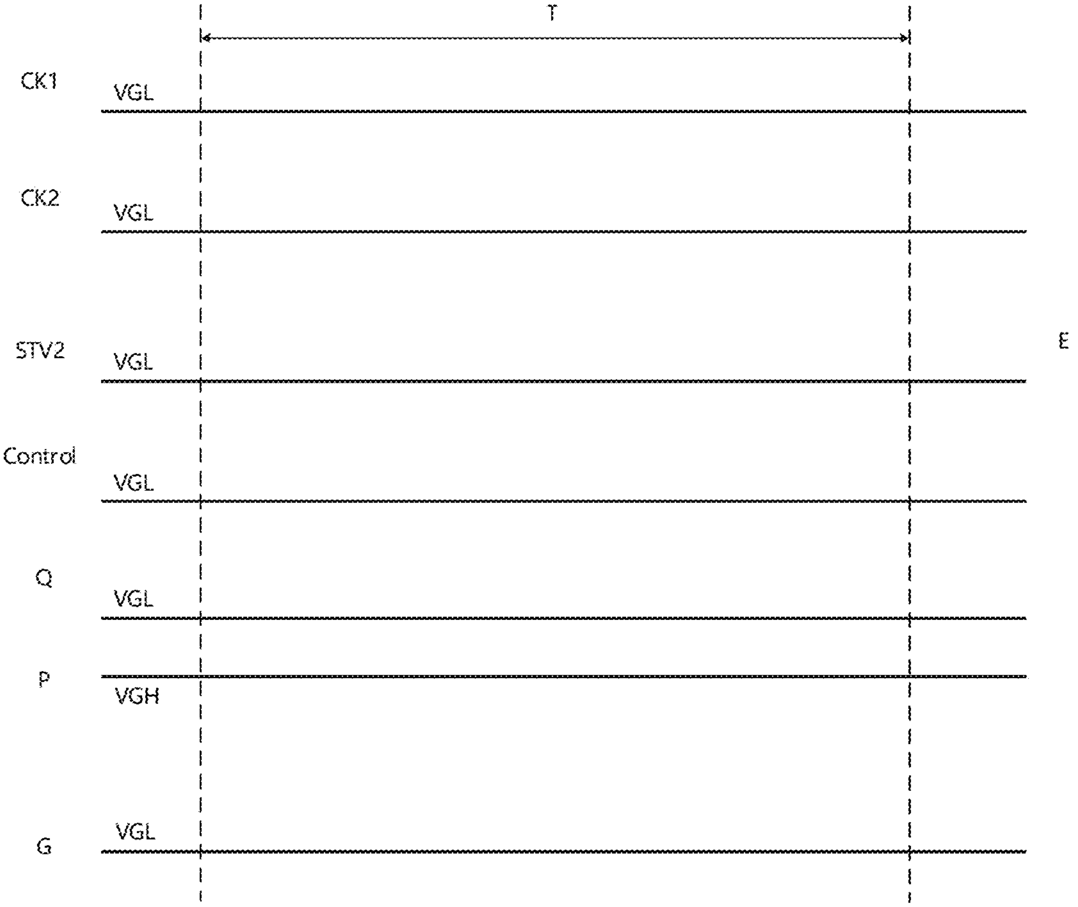
FIG. 6 is a timing diagram corresponding to the circuit diagram of FIG. 3 according to one or more embodiments of the present invention.

It will be appreciated that, as discussed above, considering that the first switching transistor T3 in FIG. 4 (taking the N-type transistor as an example) needs to be turned off, the signal Nscan (n) outputted from the output terminal G in FIG. 3 may be equal to the lower first voltage VGL. Based on this, it may be provided that, in a duration of at least one frame, in the Nscan-type first gate driving units 201 of two adjacent stages, the loading of the first clock signal CK1 is in a reverse manner from the second clock signal CK2, and that the second clock signal CK2 and the first clock signal CK1 are always equal to the same voltage (e.g., equal to the lower first voltage VGL) in a duration of at least one frame. In combination with the timing diagram (corresponding to FIG. 3) shown in FIG. 6, the analysis is as follows.

It can be found that in a duration of a frame T, for the Nscan-type first gate driving unit 201 of each stage corresponding to the first display part 101, since the first clock signal CK1 and the second clock signal CK2 are always equal to the same lower first voltage VGL, the third input transistors M11, M19 and the second output control transistor M5 are all turned on. Since the voltage of the gate of M13 is equal to VGL, the VGL can pass through the third input transistors M11, M13 to turn on M18, and the first clock signal CK1 equal to VGL passes through the M18, M19 to be loaded to the gate of the second output transistor M3. However, since the constant voltage control transistor M1 is additionally provided, and the switch control signal Control is always equal to the lower first voltage VGL, the constant voltage control transistor M1 can be turned on so that the VGH is loaded to the gate of the second output transistor M3 (the second node P) through the constant voltage control transistor M1 to turn off the second output transistor M3. Meanwhile, the second clock signal CK2 is equal to VGL to turn on the second output control transistor M5, and M14 is turned on, so that the second initial signal STV2 equal to VGL can be loaded to the gate (first node Q) of the first output transistor M2 through the second output control transistors M5, M14 to turn on the first output transistor M2, so that the VGL is transmitted to the output terminal G of the Pscan-type first gate driving unit 201 through the first output transistor M2;

Meanwhile, in the present embodiment, when the first display part 101 is in the non-display state, the second clock signal CK2 and the first clock signal CK1 the corresponding multi-stage Nscan-type first gate driving units 201 to the are set to be equal constant voltage signals (for example, equal to VGL), respectively. And the power consumption for generating the first clock signal CK1 and the second clock signal CK2 circuit can be further reduced while the output terminal G of the first gate driving unit 201 is realized to output the first voltage VGL, thereby further reducing the power consumption of the display panel 100.

Figure 7:
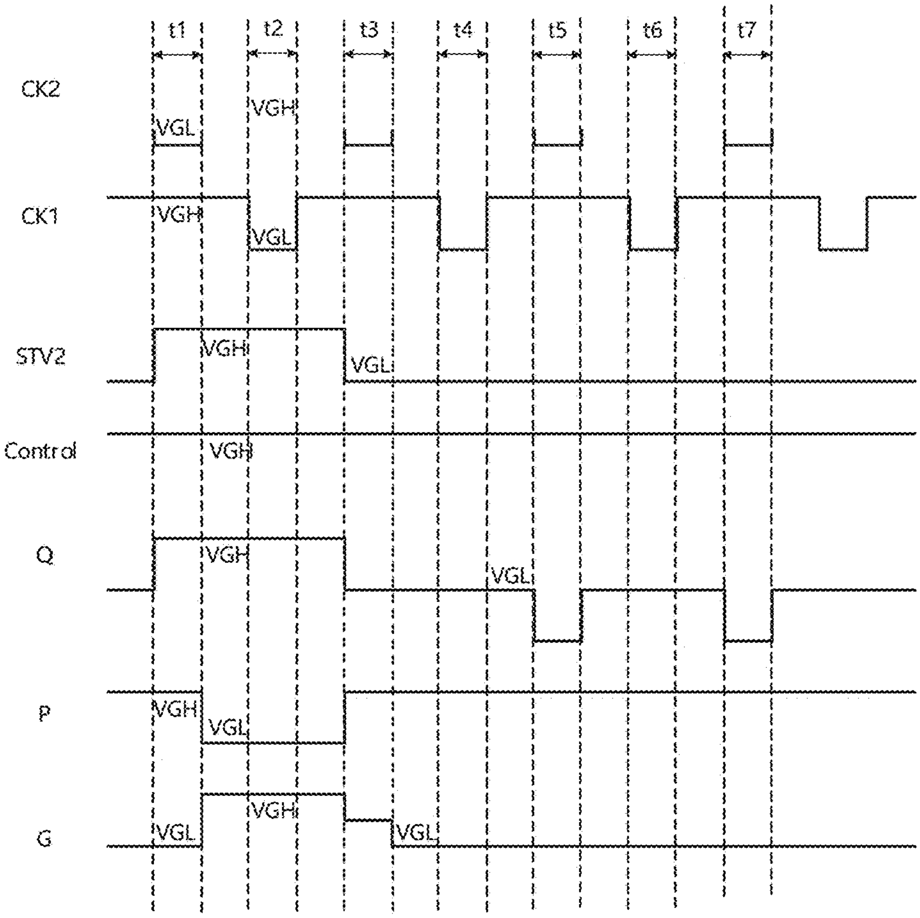
FIG. 7 is a timing diagram corresponding to a second gate driving circuit according to one or more embodiments of the present invention.

Note that, as shown in FIG. 1 and FIG. 3, as compared with FIG. 3, the circuit diagram of the Nscan-type second gate driving units 202 corresponding to the second display part 102 may omit or keep the constant voltage control unit 303 (for example, by controlling the constant voltage control transistor M1 be turned off by the switch control signal Control). Similarly, the first clock signal CK1 is loaded in a reverse manner from the second clock signal CK2 in the Nscan-type second gate driving units 202 of two adjacent stages so as to realize the normal light emission of the second display part 102. With reference to the timing diagram shown in FIG. 7 (corresponding to the arrangement where the constant voltage control unit 303 is kept in FIG. 3, and CK1 and CK2 being normal clock signals), the analysis is as follows.

At first phase t1, M13, M14 are both turned on, the switch control signal Control is equal to VGH to control the transistor M1 to be turned off. The second clock signal CK2 is equal to VGL to turn on M11. The VGL is transmitted to the gate of M18 through M11, M13 to turn on M18, and the first clock signal CK1 is equal to VGH to turn off M19, so that the voltage of the second node P is maintained to be the previous voltage VGH. And at the same time, the second clock signal CK2 is equal to VGL to turn on the second output control transistor M5, the second initial signal STV2 equal to VGH is transmitted to the gate of M20 through the second output control transistor M5 to turn off M20, and transmitted to the gate (first node Q) of the first output transistor M2 through M14 to turn off the first output transistor M2, so that the voltage of the output terminal G is maintained to be a previous voltage VGL.

At second phases t2, M13, M14 are still turned on, M1 is still turned off. The second clock signal CK2 is equal to VGH to turn off M5, so that the voltage of the first node Q is maintained to be the previous voltage VGH. The second clock signal CK2 is equal to VGH to turn off M11, so that the voltage of the gate of M18 can be maintained at VGL, M18 is still on, and the first clock signal CK1 is equal to VGL to turn on M19. The first clock signal CK1 equal to VGL is transmitted to the gate of the second output transistor M3 (the second node P) through the M18, M19 to turn on the second output transistor M3, so that the VGH is transmitted to the output terminal G through the second output transistor M3.

At third phase t3, M13, M14 is still on, M1 is still off, and the second clock signal CK2 is equal to VGL to turn on the second output control transistor M5, M11, and the second initial signal STV2 equal to VGL is transmitted to the gate (first node Q) of the first output transistor M2 through the second output control transistor M5, M14 to turn on the first output transistor M2, and the M17 is turned on in a same way, and the M16 is turned on in a same way (to charge C3). The influence of threshold voltage should be taken into account after M5 is turned on. The voltage transmitted to the gate (first node Q) of the first output transistor M2 may be considered to be equal to VGL plus the above-mentioned threshold voltage, so that the conductivity of M2 is relatively small. The voltage transmitted to the output terminal G through the first output transistor M2 is between VGL and VGH, and the second initial signal STV2 is further transmitted to the gate of M20 through the second output control transistor M5 to turn on M20. VGH is transmitted to the gate (second node P) of the second output transistor M3 through M20 to turn off the second output transistor M3.

At fourth phase t4, M13, M14 is still turned on, M1 is still turned off. The second clock signal CK2 is equal to VGH to turn off M5, M11, M16, and the terminal voltage of C3 remains unchanged. Since the CK1 applied to M17 drops down to VGL, the voltage of the first node Q can be further pulled down to increase the conductivity of M2, VGL is transmitted to the output terminal G through the first output transistor M2, and the voltage of the gate of M20 is also maintained at the previous VGL to maintain M20 turned on, and VGH is transmitted to the gate of the second output transistor M3 (the second node P) through M20 to turn off the second output transistor M3.

At fifth phase t5, M13, M14 are still turned on, M1 is still turned off, M11 is turned on, M18 is turned on, M19 is turned off, M5 is turned on, M20 is turned on. VGH is transmitted to the gate (second node P) of M3 via M20 to turn off M3. M5, M11, M16, and M17 are turned on. In this case, C3 needs to be recharged, and the potential of the first node Q also fluctuates correspondingly. At sixth phase t6, the potential of the first node Q also fluctuates correspondingly.

In one embodiment, as shown in FIG. 4, the first pixel driving circuit 501 includes a switching module including a second switching transistor T5, a third switching transistor T6, the gate of the second switching transistor T5 and the gate of the third switching transistor T6 are both electrically connected to a corresponding first gate line 401 (e.g., a fourth sub-gate line 4014) to load the gate signal (e.g., the signal EM). The second switching transistor T5, the corresponding first sub-pixel P1, and the third switching transistor T6 are connected in series, and the source or the drain of the second switching transistor T5 is loaded with a fifth voltage Vdd, and the source or the drain of the third switching transistor T6 is loaded with a sixth voltage VSS. The gate signal (e.g., the signal EM) is equal to the first voltage VGL or the second voltage VGH within a duration of at least one frame to control both the second switching transistor T5 and the third switching transistor T6 to be turned off.

It will be appreciated that, as shown in FIG. 4, even if the driving transistor T1 is turned on, if either of the second switching transistor T5 and the third switching transistor T6 is turned off, the first sub-pixel P1 will be in the non-light emitting state. Therefore, when the first display part 101 is in the non-display state, based on the fact that the second switching transistor T5 and the third switching transistor T6 are both P-type transistors, the output terminal G of the first gate driving unit 201 corresponding to the signal EM is controlled to output, for example, a smaller first voltage VGL. For example, the second switching transistor T5 and the third switching transistor T6 are both P-type transistors, in FIG. 4, so that the first sub-pixel P1 is in the non-light emitting state.

Figure 8:
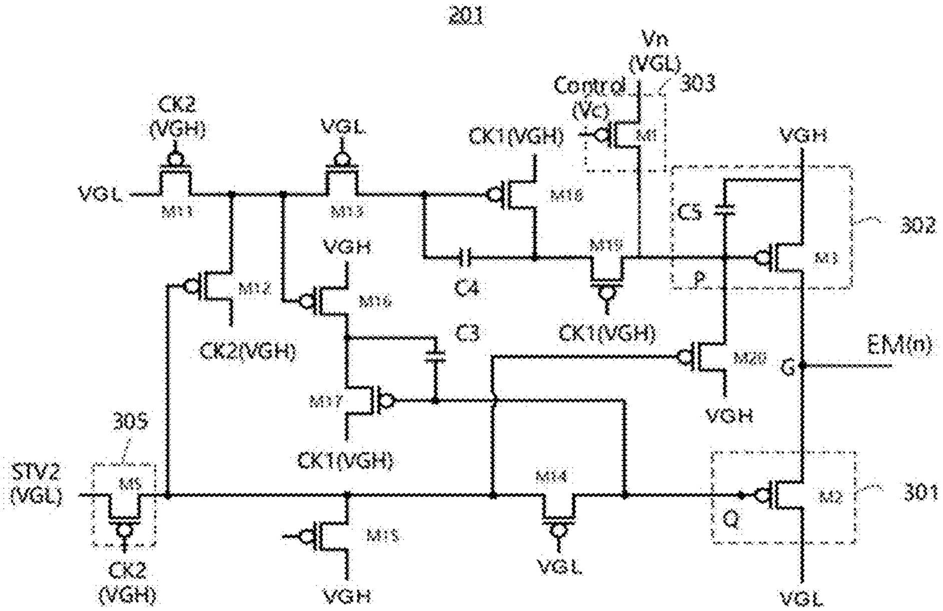
FIG. 8 is a circuit diagram of a third type of first gate driving unit according to one or more embodiments of the present invention.

In one embodiment, as shown in FIG. 8, the constant voltage control unit 303 is electrically connected to the second node P. The second output unit 302 includes a second output transistor M3, a gate of which is electrically connected to the second node P, one of a source and a drain of which is electrically connected to the output terminal G of the first gate driving unit 201, and the other of which is loaded with the second voltage VGH. The switching control voltage Vc is configured to control the node control voltage Vn to be transmitted to the second node P to turn on the second output transistor M3 so that the second voltage VGH is transmitted to the output terminal G through the second output transistor M3.

Specifically, as analyzed above, the circuit diagram shown in FIG. 8 may be understood as a circuit diagram of the EM-type first gate driving units 201, and the circuit architecture may be the same as that of the Nscan-type first gate driving units 201*e* (for details, reference may be made to the related description above). Note that in the present embodiment, the EM-type first gate driving unit 201 is set such that the second voltage VGH is transmitted to the output terminal G through the second output transistor M3 based on the fact that both the second switching transistor T5 and the third switching transistor T6 are P-type transistors, and both of them need to be turned off (high potential) to realize that the first sub-pixel P1 is in the non-light emitting state, but not as a limitation of other specific cases. Finally, the only requirement is that the voltage output from the output terminal G of the first gate driving unit 201 may control at least one of the second switching transistor T5 and the third switching transistor T6 to be turned off.

In one embodiment, as shown in FIG. 8, the first output unit 301 includes a first output transistor M2, the gate of which is electrically connected to the first node Q, one of the source and the drain of which is electrically connected to the output terminal G of the first gate driving unit 201, and the other of which is loaded with the first voltage VGL. The first gate driving unit 201 further includes a third output control unit (which essentially may include the seventh control transistor M15 described above) electrically connected to the first node Q. The third output control unit turns off the first output transistor M2 through the first node Q.

It will be appreciated that, as discussed above, the seventh control transistor M15 may be turned on when the display panel 100 is powered on to improve the problem of screen blinking. Further, in the present embodiment, the seventh control transistor M15 may be multiuse when the first display part 101 is in the non-display state, specifically, the seventh control transistor M15 in the third output control unit is controlled to be turned on, and a higher voltage is loaded to the source or the drain of the M15 to turn off the first output transistor M2, thereby avoiding interference of the first voltage VGL with the voltage (the second voltage VGH) output from the output terminal G of the first gate driving unit 201 through the first output transistor M2.

Specifically, as discussed above, considering that the first switching transistor T3 in FIG. 4 (taking the N-type transistor as an example) needs to be turned off, the signal EM (n) output from the output terminal G in FIG. 8 may be equal to the higher second voltage VGH. Based on this, it may be provided that, in a duration of at least one frame, the first clock signal CK1 is loaded in a reverse manner from the second clock signal CK2 in the EM-type first gate driving units 201 of two adjacent stages, and as shown in FIG. 8, the second clock signal CK2 and the first clock signal CK1 therein may be always equal to the same voltage (for example, equal to the higher second voltage VGH) in the duration of at least one frame, as analyzed as follows.

For the EM-type first gate driving unit 201 of each stage corresponding to the first display part 101, since the first clock signal CK1 and the second clock signal CK2 are always equal to the same higher second voltage VGH, the third input transistors M11, M19 and the second output control transistor M5 are all turned off. The constant voltage control transistor M1 can be turned on since the constant voltage control transistor M1 is additionally provided, and the switch control signal Control is always equal to the lower first voltage VGL. In this case, the node control voltage Vn can be equal to VGL, that is, the VGL is applied to the gate (the second node P) of the second output transistor M3 through the constant voltage control transistor M1 to turn on the second output transistor M3, so that the VGH is transmitted to the output terminal G of the EM-type first gate driving unit 201 through the second output transistor M3. At the same time, the seventh control transistor M15 is controlled to be turned on, and a higher voltage (e.g., VGH) is applied to the source or the drain of the M15 to be transmitted to the gate of the first output transistor M2 (the first node Q) through the M15 to turn off the first output transistor M2.

Meanwhile, in the present embodiment, when the first display part 101 is in the non-display state, the second clock signal CK2 and the first clock signal CK1 corresponding to the multi-stage EM-type of the first gate driving unit 201 are set to be equal constant voltage signals (for example, equal to VGH), respectively. And the power consumption of the circuit for generating the first clock signal CK1 and the second clock signal CK2 can be further reduced while the voltage of the output terminal G of the first gate driving unit 201 is realized to be the second voltage VGH, thereby further reducing the power consumption of the display panel 100.

Note that, as shown in FIGS. 1 and 8, as compared with FIG. 8, the circuit diagram of the EM-type second gate driving units 202 corresponding to the second display part 102 may omit or keep the constant voltage control unit 303 (for example, by controlling the constant voltage control transistor M1 to be turned off by the switch control signal Control). Similarly, the first clock signal CK1 is loaded in a reverse manner from the second clock signal CK2 in the EM-type first gate driving units 201 of two adjacent stages to realize normal light emission of the second display part 102.

One or more embodiments of the present invention further provide an electronic apparatus including the display panel as described above.

The present invention provides a display panel and an electronic apparatus, including a first display part, a second display part located on at least one side of the first display part, a plurality of pixel driving circuits electrically connected to the first display part and the second display part, and a plurality of first gate driving units arranged in cascade and electrically connected to the first display part. The first gate driving units each include a first output unit, a second output unit and an output terminal electrically connected to a corresponding first sub-pixel, the first output unit is for transmitting a first voltage to the output terminal in response to a voltage of a first node, the second output unit is for transmitting a second voltage to the output terminal in response to a voltage of a second node. The present invention further includes a constant voltage control unit electrically connected to the first node or the second node, the constant voltage control unit being configured to transmit a node control voltage to the first node or the second node in response to a switching control voltage, so that the first display part is in a non-display state in a duration of at least one frame, and the output terminal constantly outputs the first voltage in the duration of the at least one frame, thereby reducing power consumption of the first gate driving units, thereby reducing power consumption of the gate drive module.

The present invention has been described in detail with reference to a display panel and an electronic apparatus according to one or more embodiments of the present invention, in which specific examples are used to explain the principles and embodiments of the present invention. The description of the above embodiments is merely provided to help understand the technical solution of the present invention and the core idea thereof. It will be appreciated by those of ordinary skill in the art that modifications may still be made to the technical solutions described in the foregoing embodiments, or equivalents may be made to some of the technical features therein. These modifications or substitutions do not depart the essence of the corresponding technical solutions from the scope of the technical solutions of the various embodiments of the present invention.

What is claimed is:

1. A display panel comprising:
a first display part;
a second display part located on at least one side of the first display part;
a plurality of pixel driving circuits electrically connected to the first display part and the second display part;
a plurality of gate driving units, each gate driving unit comprising a first output unit, a second output unit, and an output terminal electrically connected to a corresponding pixel driving circuit of the pixel driving circuits, the first output unit and the second output unit being configured to output a gate signal to a gate of at least one transistor of the pixel driving circuit in response to a voltage of a first node and a voltage of a second node, respectively;
wherein the plurality of gate driving units comprise a plurality of first gate driving units arranged in cascade and electrically connected to the first display part; and
wherein each first gate driving unit includes a constant voltage control unit electrically connected to the first node or the second node, and the constant voltage control unit is configured to transmit a node control voltage to the first node or the second node in response to a switching control voltage, so that the first display part is always in a non-display state within a duration of at least one frame.

2. The display panel according to claim 1, wherein the first output unit is configured to transmit a first voltage as the gate signal to the output terminal in response to the voltage of the first node, and the second output unit is configured to transmit a second voltage as the gate signal to the output terminal in response to the voltage of the second node;
wherein the first display part comprises a plurality of first sub-pixels, the plurality of pixel driving circuits comprise a plurality of first pixel driving circuits electrically connected to the plurality of first sub-pixels respectively, and the display panel further comprises:
a plurality of first gate lines electrically connected to a plurality of the output terminals of the plurality of first gate driving units respectively, each first pixel driving circuit being electrically connected between a corresponding first sub-pixel of the first sub-pixels and a corresponding first gate line of the first gate lines; and
wherein the first gate line is electrically connected to a gate of at least one transistor of the first pixel driving circuit to transmit the first voltage or the second voltage in the duration of at least one frame to control the at least one transistor so that the first sub-pixel in the first display part is always in a non-light emitting state in the duration of at least one frame.

3. The display panel according to claim 2, wherein each first pixel driving circuit comprises:
a reset module comprising a first reset transistor, a gate of the first reset transistor being electrically connected to the corresponding first gate line to be loaded with the gate signal, one of a source and a drain of the first reset transistor being loaded with a third voltage and the other being electrically connected to the first sub-pixel; and wherein the gate signal is equal to the first voltage or the second voltage in the duration of at least one frame to control the first reset transistor to be turned on so that the third voltage is transmitted to the corresponding first sub-pixel so that the first sub-pixel is in the non-light emitting state.

4. The display panel according to claim 3, wherein the constant voltage control unit is electrically connected to the first node;

the first output unit comprises a first output transistor, a gate of the first output transistor is electrically connected to the first node, one of a source and a drain of the first output transistor is electrically connected to the output terminal of the first gate driving unit and the other is loaded with the first voltage; and wherein the switching control voltage is used to control the node control voltage to be transmitted to the first node in the duration of at least one frame to turn on the first output transistor so that the first voltage is transmitted to the output terminal through the first output transistor.

5. The display panel according to claim 4, wherein the second output unit comprises a second output transistor, a gate of the second output transistor being electrically connected to the second node, one of a source and a drain of the second output transistor being electrically connected to the output terminal of the first gate driving unit and the other being loaded with the second voltage;

the first gate driving unit further comprises a first output control unit electrically connected between the constant voltage control unit and the second node; and wherein the switching control voltage is configured to control the node control voltage to be transmitted to the first output control unit in the duration of at least one frame so that the first output control unit turns off the second output transistor through the second node.

6. The display panel according to claim 2, wherein the first gate line comprises a first sub-gate line, a second sub-gate line, and a third sub-gate line, the gate signal comprises a first gate signal, a second gate signal, and a third gate signal, and the first pixel driving circuit comprises:

a driving module comprising a driving transistor and a first switching transistor, the first switching transistor being connected between a gate and a drain of the driving transistor, a drain of the driving transistor being connected to the first sub-pixel, and a gate of the first switching transistor being electrically connected to the third sub-gate line to be loaded with the third gate signal;

a write module comprising a write transistor, a gate of the write transistor being electrically connected to the first sub-gate line to be loaded with the first gate signal, one of a source and a drain of the write transistor being loaded with a data voltage signal, and the other being electrically connected to a source of the drive transistor;

a reset module comprising a second reset transistor, a gate of the second reset transistor being electrically connected to the second sub-gate line to be loaded with the second gate signal, one of a source and a drain of the second reset transistor being loaded with a fourth voltage, and the other being electrically connected to the gate of the driving transistor;

a maintaining module electrically connected to the gate of the driving transistor;

wherein in a duration of a $m^{th}$ frame, the second gate signal is configured to control the second reset transistor to be turned on so that the fourth voltage is transmitted to the gate of the driving transistor to turn off the driving transistor, and m is a positive integer; and wherein in a duration of a $(m+1)^{th}$ frame, the third gate signal is equal to the first voltage or the second voltage to control the first switching transistor to be turned off, and the maintaining module is configured to maintain the driving transistor to be turned off.

7. The display panel according to claim 6, wherein the constant voltage control unit is electrically connected to the second node;

the second output unit comprises a second output transistor, a gate of the second output transistor being electrically connected to the second node, one of a source and a drain of the second output transistor being electrically connected to the output terminal of the first gate driving unit and the other being loaded with the second voltage; and wherein in the duration of the $(m+1)^{th}$ frame, the switching control voltage is configured to control the node control voltage to be transmitted to the second node to turn off the second output transistor.

8. The display panel according to claim 7, wherein the first output unit comprises a first output transistor, a gate of the first output transistor being electrically connected to the first node, one of a source and a drain of the first output transistor being electrically connected to the output terminal of the first gate driving unit, and the other being loaded with the first voltage;

the first gate driving unit further comprises a second output control unit electrically connected to the first node; and wherein in the duration of the $(m+1)^{th}$ frame, the second output control unit is configured to turn on the first output transistor through the first node so that the first voltage is transmitted to the output terminal through the first output transistor.

9. The display panel according to claim 6, wherein the second gate signal and the third gate signal are electrically connected to two first gate driving units of the first gate driving units of different stages, respectively, and circuit structures of the two first gate driving units are the same.

10. The display panel according to claim 6, wherein the first gate driving unit comprises:

a first clock signal line for transmitting a first clock signal;

a second clock signal line for transmitting a second clock signal;

wherein the second clock signal and the first clock signal are always equal to a same voltage in the duration of at least one frame.

11. The display panel according to claim 2, wherein the first pixel driving circuit comprises:

a switching module comprising a second switching transistor and a third switching transistor, wherein a gate of the second switching transistor and a gate of the third switching transistor are electrically connected to the corresponding first gate line to be loaded with the gate signal, the second switching transistor, the corresponding first sub-pixel and the third switching transistor are connected in series, a source or a drain of the second switching transistor is loaded with a fifth voltage, and a source or a drain of the third switching transistor is loaded with a sixth voltage; and wherein the gate signal is equal to the first voltage or the second voltage in the duration of at least one frame to control both the second switching transistor and the third switching transistor to be turned off.

12. The display panel according to claim 11, wherein the constant voltage control unit is electrically connected to the second node;

the second output unit comprises a second output transistor, a gate of the second output transistor being electrically connected to the second node, one of a source and a drain of the second output transistor being electrically connected to the output terminal of the first gate driving unit, and the other being loaded with the second voltage; and wherein the switching control voltage is configured to control the node control voltage to be transmitted to the second node to turn on the second output transistor so that the second voltage is transmitted to the output terminal through the second output transistor.

13. The display panel according to claim 12, wherein the first output unit comprises a first output transistor, a gate of the first output transistor being electrically connected to the first node, one of a source and a drain of the first output transistor being electrically connected to the output terminal of the first gate driving unit, and the other being loaded with the first voltage;

the first gate driving unit further comprises a third output control unit electrically connected to the first node; and wherein the third output control unit turns off the first output transistor through the first node.

14. The display panel according to claim 1, wherein the constant voltage control unit comprises:

a constant voltage control transistor, wherein one of a source and a drain of the constant voltage control transistor is loaded with the node control voltage and the other is electrically connected to the corresponding first node or the second node; and wherein a gate of the constant voltage control transistor is used to be loaded with the switching control voltage to control the constant voltage control transistor to be turned on to control the node control voltage to be transmitted to the first node or the second node so that the first display part is in the non-display state.

15. An electronic apparatus, comprising the display panel according to claim 1.

* * * * *